United States Patent

[11] 3,586,942

| [72] | Inventor | James E. McMahan<br>340 West End Blvd., Winston-Salem, N.C. 27101 |
|---|---|---|
| [21] | Appl. No. | 753,355 |
| [22] | Filed | Aug. 19, 1968 |
| [45] | Patented | June 22, 1971 |

[54] SELF COMMUTATED MOTOR HAVING A 16—18 RATIO OF ARMATURE POLES TO ROTOR POLES
7 Claims, 11 Drawing Figs.

[52] U.S. Cl. .................................................. 318/254, 318/439, 310/156
[51] Int. Cl. ............................................. H02k 29/00
[50] Field of Search ........................................ 318/138, 254, 439; 310/47, 156

[56] References Cited
UNITED STATES PATENTS

| 2,725,512 | 11/1955 | Padron | 318/254 |
| 2,968,755 | 1/1961 | Baermann | 310/154 X |
| 3,139,547 | 6/1964 | Shafranek et al. | 318/254 X |
| 3,250,977 | 5/1966 | Heggen | 318/254 |
| 3,391,318 | 7/1968 | Hirokawa | 318/138 X |
| 3,418,550 | 12/1968 | Kolatorowkz et al. | 318/254 X |
| 3,419,782 | 12/1968 | Sheldrake et al. | 318/254 X |
| 3,453,512 | 7/1969 | Polakowski | 318/254 X |

Primary Examiner—G. R. Simmons
Attorneys—Charles Y. Lackey and Anthony J. Castorina ABSTRACT: A magnetic motor which includes a rotor, having a preselected number of polarized magnetic poles spaced about its periphery rotating with respect to an armature having a differing, preselected number of circumferentially spaced, magnetic poles, the motor utilizing at least four pole-polarity switching circuits responsive to the rotation of the rotor each of which circuits will selectively reverse the polarity of the armature poles to continue the rotation of the rotor with respect to the armature.

PATENTED JUN22 1971 3,586,942

PATENTED JUN22 1971 3,586,942
SHEET 2 OF 3
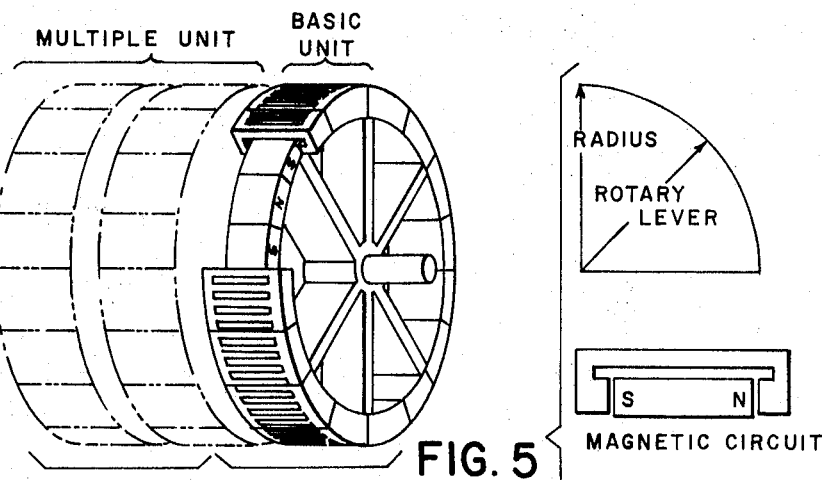
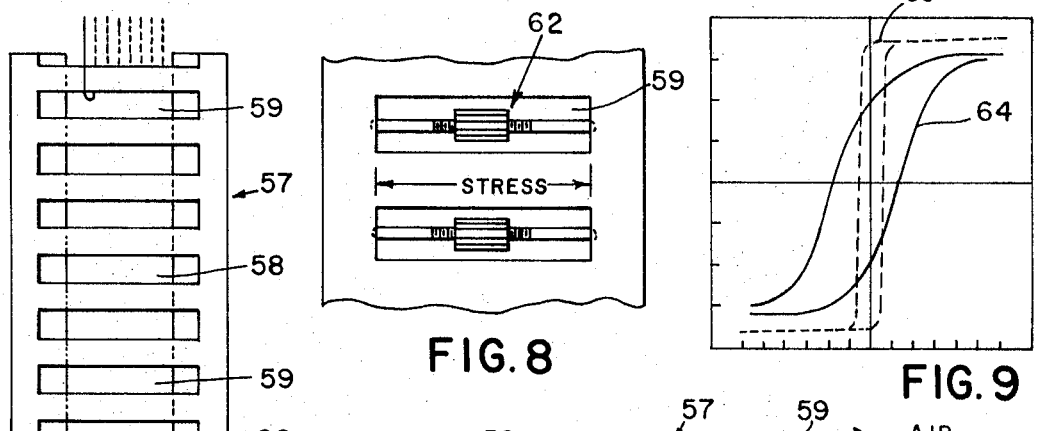
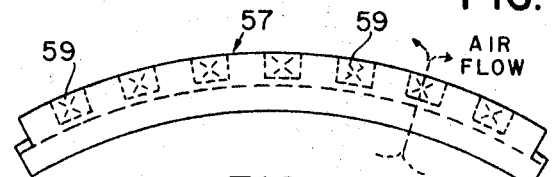
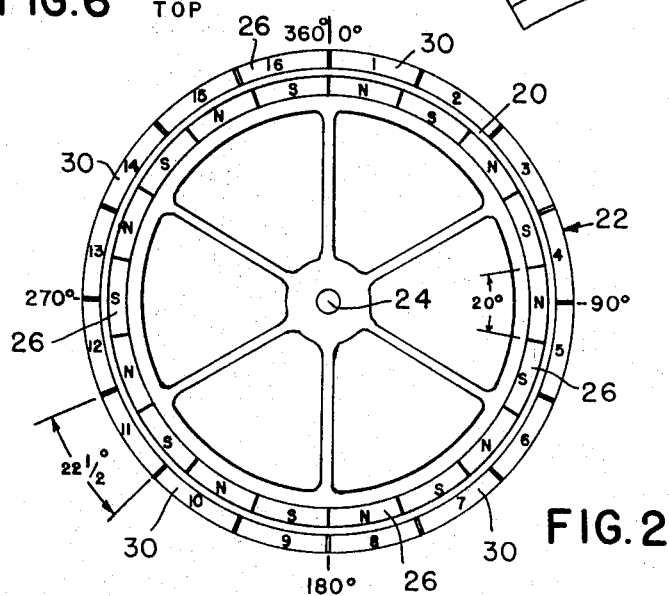

3,586,942

SELF COMMUTATED MOTOR HAVING A 16—18 RATIO OF ARMATURE POLES TO ROTOR POLES

BACKGROUND, BRIEF SUMMARY AND OBJECTIVES OF THE INVENTION

Intense research is now being conducted to provide a substitute for the conventional internal combustion engine generally associated with self-propelled vehicles or other equally important applications. The hazards and disadvantages resulting from the continued use of large numbers of internal combustion engines have pushed the automotive industry to the limit in a search for either a steam turbine or an electrically operated engine which will be practical, economical, and relatively maintenance free and which will provide adequate and efficient service.

A great deal of research and engineering has been associated with the development of an efficient, electrically operated motor, since self-propelled vehicles usually require a large battery supply which needs constant recharging and is self-sustaining only for a limited radius from a charging center. Additionally, this battery must be large in capacity since the electric motor operates solely from the stored potential furnished by the battery or batteries making up the battery supply. It is conventional practice to construct electric motors with rotors having permanent magnetic poles and armatures with electrically energized fieldpoles, the current for which is supplied either from a source of alternating current or from commutators rotating with the rotor. In all such instances, the maximum speed of the motor is limited by the frequency of the alternating current or by the ability of the commutator to reverse rapidly the flow of the current in the armature coils.

In an effort to overcome the obvious difficulties in conventional motors suitable for use in self-propelled vehicles and other power sources, the present invention has been developed. In accordance with known principles, a magnetically operated motor is provided with a rotor having a plurality of circumferentially spaced polarized permanent magnets and an armature having other circumferentially spaced magnetic poles arranged to face sequentially the rotor poles as the rotor rotates about its axis. The motor includes pole-polarity switching circuits which switch or reverse the polarity of the armature poles selectively at a particular rotational relationship between the rotor poles and the armature poles.

In order to provide an effective electrical motor for use in a vehicle or other device, it will be necessary to have a unit which consumes a relatively small amount of current while developing enough mechanical force to drive an alternator or turn a crankshaft or the like. By using permanent magnets and electromagnets, the permanent magnets being carried by the rotor an internal energy source is provided which is effective to cause rotor rotation while using low current to energize the rotation controlling electromagnet poles.

It has been found that a particular ratio of electromagnets carried by the armature and permanent magnets carried by the rotor is particularly effective in achieving the desired torque so that the rotor is kept continuously rotating because of that numerical relationship and the momentum of the rotor once rotation is commenced. So long as there are at least 16 electromagnets located about the periphery of the armature and at least 18 permanent magnets located about the periphery of the rotor, a unique relationship is achieved which will allow four switching circuits to control the complete polarization of all the electromagnets contained in the armature. Any multiple of permanent magnets and electromagnets of this basic 16 to 18 ratio is equally suitable for application in the motor construction.

In one embodiment of the motor, a novel electromagnet configuration provides additional advantages in cooling, construction and results. Because of slots provided in the electromagnet core structure, a separate force-exerting device can be attached which will place a mechanical stress on the core material to increase substantially the permeability, this factor permitting the incorporation of high speed circuit switching devices if such are desirable.

From the preceding discussion, it is apparent that a principal object of the present invention is to provide a new and improved magnetic motor which is simple in construction, efficient in operation, and economically manufactured.

Another object of the present invention is to provide a magnetic motor of the type described which will have a high operational efficiency and permit armature pole polarization by a maximum of four switching circuits no matter how many poles are included.

A further object of the present invention is to provide a new and improved magnetic motor which may be effectively operated by switching circuits or high speed switching pulsers.

Yet a further object of the present invention is to provide a magnetic motor utilizing a unique ratio of electromagnets and permanent magnets, which ratio or any multiple thereof, will provide a highly efficient motor requiring a maximum of four switching circuits for operational control.

Yet still a further object of the present invention is to provide a magnetic motor of the type described which utilizes a novel structural configuration for the electromagnets wherein a magnetic permeability is increased sufficiently to allow the use of a high speed switching device for polarization.

Yet still another further object of the present invention is to provide a magnetic motor having an efficiency and capacity sufficient to operate self-propelled vehicles or to operate other devices as an effective substitute to conventional internal combustion engines.

These and other objects and advantages of the invention will become apparent by referring to the following detailed description in conjunction with the accompany drawings wherein like characters of reference designate similar elements throughout the figures.

FIGURE DESCRIPTION

FIG. 1 is a block diagram illustrating the operational components of a system which will drive a self-propelled vehicle wherein the magnetic motor of the present invention supplies torque to drive an electrical alternator as well as a mechanical load represented by a crankshaft or the like.

FIG. 2 is an operational diagram of the rotor and armature pole relationship showing the basic electromagnet to permanent magnet ratio for operation of the present invention.

FIG. 4 illustrates the basic unit of the magnetic circuit relationship used in the present invention wherein one electromagnet to permanent magnet relationship is established on one surface unit and the same relationship is established on the opposite side of that unit, and wherein the permanent magnets are positioned on the periphery of the rotor, a distance from the axis which is equal to the rotor radius.

FIG. 5 is an enlarged view of a single electromagnet and permanent magnet of the basic unit forming a magnetic circuit like those shown in FIG. 4 as well as a force diagram showing the moment of force established by the permanent magnets affixed to the rotor periphery about the axis of rotation.

FIG. 6 is a top view of a single electromagnet component of the armature showing the latticed or ladderlike configuration of the component and the coil arrangement therewith.

FIG. 7 is a side elevational view of the unit shown in FIG. 6 illustrating the increased air circulation made possible by the configuration of this electromagnet.

FIG. 8 is a top, sectional and enlarged view of the electromagnet structure of FIG. 6 showing the use of mechanical stress-inducing devices to change the permeability of the core substance.

FIG. 9 is a plot of a conventional hysteresis-loop shown in solid lines contrasted with the plot of a hysteresis-loop for 68 Permalloy shown in dotted lines after tension has been exerted on the magnetic substance by means of a device such as shown in FIG. 8.

Figure 10:
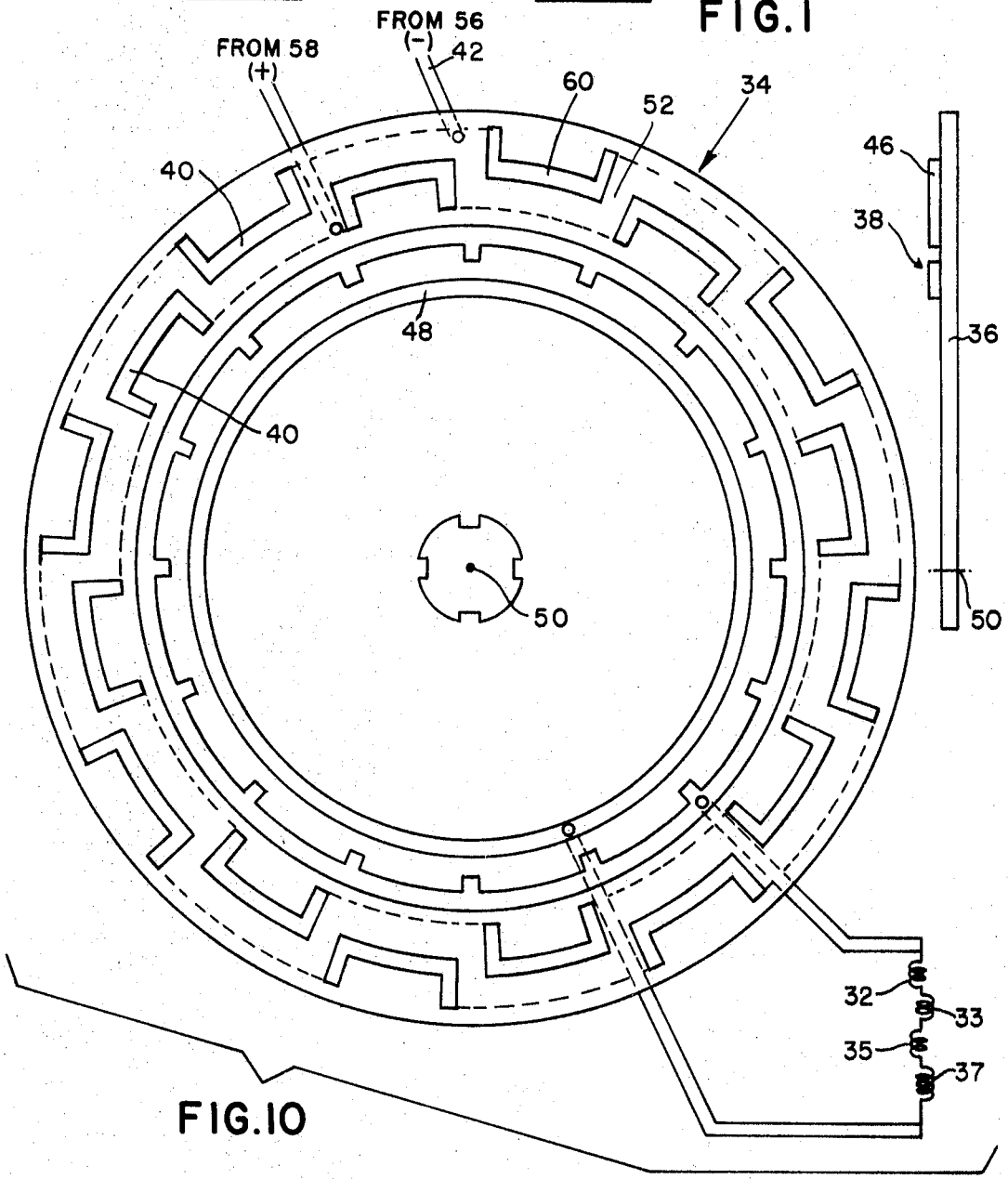

FIG. 10 is a diagrammatic illustration of a simple mechanical switch utilizing a wiper arm which will effectively control the polarity of four pole pairs located in the armature of the motor.

Figures 3, 11:
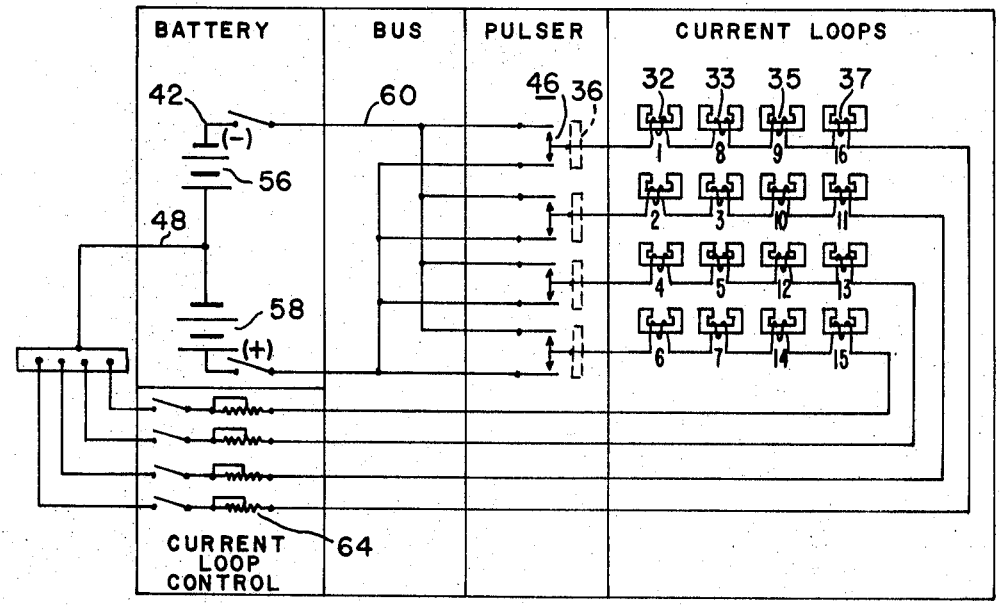
FIG. 3 is a polarity pattern diagram showing the plotted polarities needed on the electromagnets to maintain a torque on the permanent magnets of the rotor.

FIG. 11 is a schematic diagram of the electrical circuit for controlling the operation of the present magnetic motor.

DETAILED DESCRIPTION OF THE INVENTION

Referring now to the drawings wherein the showings are for the purposes of clearly shown preferred embodiments of the invention only, and not for the purposes of limiting same, FIG. 2 shows a magnetic motor comprised of a rotor 20 and having an armature 22 cooperating to form magnetic circuits which will be subsequently described. The rotor 20 is supported for rotation on a shaft 24, which is in turn mounted in suitable bearings that are not shown. The rotor 20 includes a plurality of circumferentially spaced and polarized magnetic poles 26 indicated by the letters N and S in the operational diagram shown in FIG. 2, these poles forming magnets lying parallel to the axis of rotation of the rotor 20 as more clearly shown in FIG. 4.

The poles on the rotor 20 may be provided by any suitable means such as, for example, electrically energized coils, but in the preferred embodiment, are formed of a permanent magnetic material mixed with a suitable binder material and molded to the cylinderal shape illustrated. The permanent magnetic polarity may be induced either in the molding of the rotor or after the molding, by conventional means.

The armature 21 is designed so that the 16 electromagnets 30 must be polarized as shown in FIG. 3 to rotate the rotor 20 in a clockwise direction. In order to maintain a force on the rotor, the electromagnets 30 must be switched in relationship to the rotation of the permanent magnets as also reflected in FIG. 3.

The strength of the magnetic fields between the permanent magnetic ring and the electromagnet ring, and the torque resulting from that magnetic strength or relationship, is normally governed by the current in the electromagnet windings representatively illustrated in FIGS. 10 and 11 and designated as 32, 33, 35 and 37. The physical control of these windings or coils will be discussed in detail subsequently, but for now it can be seen from FIG. 3 that electromagnetic pole number 1 (see FIG. 2) must be switched for every 20° degrees of rotor rotation in order to maintain a torque on the rotor 20. After 40° of rotation, the pattern repeats itself. In studying this relationship, it will be noted that the polarity of electromagnetic pole number 8 is always the same as polarity of electromagnetic pole number 1, and electromagnetic poles numbered 9 and 16 are always of opposite polarity to the polarity of poles numbered 1 and 8. This same relationship exists with poles numbered 2, 11, 3, and 10; poles numbered 4, 13, 5, and 12; and poles numbered 6, 15, 7 and 14. Because the electromagnetic poles may be classified in groups of four insofar as switching is concerned; it will be readily apparent that all 16 electromagnets can be controlled with four current loops, i.e. one current loop for four electromagnets.

The above-discussed concept can be best illustrated by reference to the polarity pattern illustrated in FIG. 3 where it can be seen that electromagnetic poles numbered 1, 8, 9, and 16 must be switched at 0°, 20°, 40°, and so on, until the cycle is repeated at 360° or 0°. Electromagnetic poles numbered 2, 3, 11, and 10 must be switched at 5°, 25°, 45° and so on until the cycle is repeated. Electromagnetic poles numbered 4, 5, 13, and 12 must be switched at 10°, 30°, 50° and so on until once again this cycle is also repeated. And finally, electromagnetic poles numbered 6, 7, 14 and 15 must be switched at 15°, 35°, 55° and so on until the cycle is again repeated. This group pattern illustrates that only one of the four current loops controlling the 16 electromagnets must be reversed for every 5° of rotor rotation to maintain the torque on the rotor.

The method of switching the voltage polarity applied to the four coils controlling the 16 electromagnets may obviously be done in any one of several ways representative of which could be solid state pulsing devices as well as mechanical means. For simplicity in switching, timing, and current control, a simple electromechanical wiper system is herein illustrated which will provide adequate control for the magnetic motor. A circular grid device shown generally as 34, is provided for each of the four grouped current coils such as, for example, those indicated as 32, 33, 35 and 37. Each grid device cooperates with a wiper 36 carrying raised conductive elements 38 and 46 that communicate with a conductive grid element 60 to establish a circuit from voltage supply 56, through element 60, through elements 46 and 38, and back through a common grid element 48 to the voltage supply. Referring to FIG. 11, it can be seen that this arrangement will provide electrical conductivity through coils 32, 33, 35 and 37 first in one direction (one polarity) and then another (the other polarity) depending upon the position of wiper conductor element 46 with respect to grid elements 40 and 60. As the wiper arm 36 rotates about its axis 50 and passes from grid element 60 to a front surface void 52, the circuit is interrupted, the coils 32, 33, 35 and 37 are deenergized and the system is readied for a second energized state brought about when the wiper arm conductor element 46 contacts grid element 40. This will energize coils 32, 33, 35 and 37 to polarize those coils at the opposite polarity. Obviously, this switching device must be keyed to the shaft for switching at the proper time and must be of sufficient current capacity to allow proper energization of the various coils. Note that grid elements 40 and 60 are continuous rings about the grid device 34 appearing in alternate sections on first one side and then the other to provide selective circuit making characteristics.

The wiper system control circuit is schematically illustrated in FIG. 11 wherein the DC voltage supplies 56 and 58 are connected in one instance by a conductor 60 to a switching device 46, and then to the series-connected polarizing coils 32, 33, 35 and 37 and finally back through a current regulating, variable resistor 64 (not shown in FIG. 10) to the base potential terminal 48 of the DC voltage supply. Note that the various coil windings for the particularly designated electromagnets are sequentially reversed in direction to achieve polarization of the opposite polarity, by reason of the coil directional windings. The additional polarity reversing technique is achieved by the battery 58 being connected in an opposite relationship, i.e., in the opposite polarity to the first battery 56, so that energization through the double pole contact 46 (on the wiper arm 36) and through the various coil groups in an opposite direction can be achieved. It is apparent that rotation of the wiper arm 36 about these circular grid switching devices 34 will provide the necessary switching means through changing the polarity of the various coil groupings.

FIG. 6 illustrates a desirable configuration for the electromagnetic substance for each of the electromagnets. The structure is formed from a flat, curved plate shown generally as 57 within which is provided a plurality of slots 59 extending substantially across the widths of the segments 57 in the manner shown best in FIG. 6. The provision of the various slots will allow the dissipation of heat because of induced airflow such as suggested in FIG. 7 (see arrows), and thus will provide a high operational efficiency. Wiring the electromagnet along a horizontal member 60 as shown in FIG. 6 permits the simultaneous switching of electromagnets in compounded fashion as shown in FIG. 4. Additionally, the slots 59 permit the insertion of mechanical or equivalent stress devices such as designated 62, so that a stress may be applied to the electromagnet core substance 57. Stress affects the magnetic characteristics in ferromagnetic substances as shown in the graph in FIG. 9 where a hysteresis loop 64 shown in solid lines for 69 Permalloy with no stress applied is compared with that same substance under a stress of 2,800 pounds per square inch represented by the hysteresis loop 66 shown in broken line. The result is that permeability is increased approximately seven times, this permitting a substantial advantage in switching time from one polarization to another.

The appropriate theory and scientific development of magnetic permeability as affected by induced mechanical stresses is fully developed by Professor Richard M. Bozonth in his book, entitled *Ferromagnetic Materials*.

The four control coils controlling the electromagnets can be looped through a number of identical electromagnet rings or stages of electromagnets and thus control 16, 32, 48, or any other multiple thereof of electromagnets. Each time 18 additional permanent magnets are mounted on the shaft and 16 additional electromagnets are added to attract the permanent magnets, another stage is added to the magnetic motor. The ratio of electromagnets to permanent magnets is basically 16 to 18 though, as discussed above, additional ratios of 32 to 36, 64 to 72, 128 to 144, and so on, are possible while still controlling the entire operation of the motor by only four control circuits.

Figure 1:
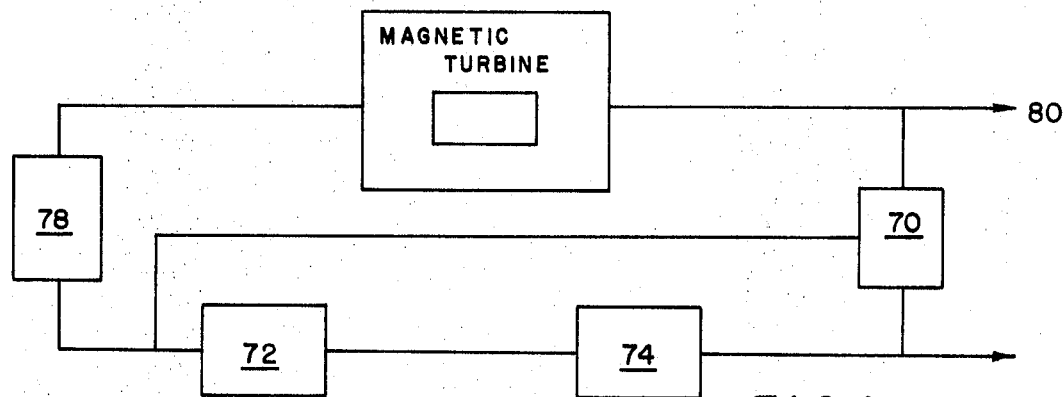

The external circuit most likely to be used in vehicles is illustrated in FIG. 1. Through the switch and control circuit 78, the magnetic motor will be moved by a torque created between the rotor and armature as previously described. The mechanical load 80 represented by the crankshaft, axle or any other similar mechanically loaded device will be rotated by revolutions of the rotor shaft 24.

A significant rotational effect is achieved by the fact that initial movement of the rotor with respect to the armature by magnetic attraction creates a flywheel effect in that mass in motion has a tendency to perpetuate that motion unless overcome. This flywheel effect will act to sustain rotation of the rotor once magnetic forces have initiated rotor rotation.

While there has been described a preferred embodiment of a magnetic motor uniquely controlled by a maximum of four control circuits and constructed about an extremely effective ratio of electromagnets to permanent magnets, it will be obvious to those skilled in the art of electric motor construction that any number of changes may be made in the rotor and armature construction, the switching devices and the control system as well as other phases of the present invention concept without departing from the spirit of the invention within the scope of the appended claims. Such modifications and alternatives as wells as the use of mechanical and electrical equivalents are contemplated.

I claim:
1. A magnetic motor comprising:
a rotor having 18 or whole number multiplies thereof polarized magnetic poles spaced about the periphery thereof in alternating polarity fashion; an armature comprising 16 or whole number multiples thereof circumferentially spaced electromagnetic poles connected in four selectively energizable circuits each having an equal number of poles; and polarity switching means for activating each of said four circuits responsive to the rotation of said rotor whereby a continuous force is exerted by said armature poles against said rotor poles to maintain rotation of said rotor with respect to said armature.

2. The magnetic motor as claimed in claim 1 wherein all armature circuits are energized at one polarity or the other except during switching time.

3. The magnetic motor as claimed in claim 2, said circuit polarity switching means including means providing selectively spaced voltage pulses selectively energizing said armature circuit poles first to one polarity and then to the opposite polarity as said rotor is rotated with respect to said armature.

4. The magnetic motor as claimed in claim 3, said circuit polarity switching means further including circular grid means, and wiper means responsive to rotation of said rotor and operable with said grid means to actuate selectively one armature circuit every 20° of rotation by said rotor so that a continuing force against said rotor poles by said armature poles is maintained and a switching circuit is activated every 5° of rotation by the rotor.

5. The magnetic motor as claimed in claim 1, said circuit polarity switching means including means providing selectively spaced voltage pulses selectively energizing said armature circuit poles first to one polarity and then to the opposite polarity as said rotor is rotated with respect to said armature.

6. The magnetic motor as claimed in claim 4, said circuit polarity switching means further including circular grid means, and wiper means responsive to rotation of said rotor and operable with said grid means to actuate selectively one armature circuit every 20° of rotation by said rotor so that a continuing force against said rotor poles by said armature poles is maintained and a switching circuit is activated every 5° of rotation by the rotor.

7. The magnetic motor as claimed in claim 1, each of said armature poles having a plurality of spaced-apart openings therein, and force-exerting means positioned in said openings to exert a mechanical stress within said armature poles and thereby increase the permeability thereof.